(12) United States Patent
Park et al.

(10) Patent No.: US 10,698,903 B2
(45) Date of Patent: Jun. 30, 2020

(54) AUTOMATIC PARALLELIZATION FOR GEOFENCE APPLICATIONS

(71) Applicant: Oracle International Corporation, Redwood Shores, CA (US)

(72) Inventors: Hoyong Park, San Jose, CA (US); Sandeep Bishnoi, Mill Valley, CA (US); Prabhu Thukkaram, San Ramon, CA (US); Iuliia Shmeleva, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 331 days.

(21) Appl. No.: 15/705,402

(22) Filed: Sep. 15, 2017

(65) Prior Publication Data

US 2018/0075108 A1 Mar. 15, 2018

Related U.S. Application Data

(60) Provisional application No. 62/395,204, filed on Sep. 15, 2016.

(51) Int. Cl.
  *G06F 16/2455* (2019.01)
  *G06F 16/29* (2019.01)
  (Continued)

(52) U.S. Cl.
  CPC .... *G06F 16/24568* (2019.01); *G06F 16/2237* (2019.01); *G06F 16/2272* (2019.01);
  (Continued)

(58) Field of Classification Search
  USPC ........................................................ 707/696
  See application file for complete search history.

(56) References Cited

U.S. PATENT DOCUMENTS

| 9,042,911 B1 * | 5/2015 | Wise ..................... H04W 4/029 455/456.1 |
| 9,298,788 B1 * | 3/2016 | Kekre ................. G06F 11/1402 |

(Continued)

FOREIGN PATENT DOCUMENTS

| WO | 2018053320 | 3/2018 |
| WO | 2018053329 | 3/2018 |

OTHER PUBLICATIONS

U.S. Appl. No. 15/705,406, "Non-Final Office Action", dated Jun. 14, 2018, 15 pages.

(Continued)

*Primary Examiner* — Hosain T Alam
*Assistant Examiner* — Nicholas E Allen
(74) *Attorney, Agent, or Firm* — Kilpatrick Townsend & Stockton LLP

(57) ABSTRACT

An event processing system for processing events in an event stream is disclosed. The system can execute instructions to receive a continuous data stream related to an application, identify an input geometry associated with the continuous data stream, generate a cluster of geometries based at least in part on the input geometry, generate an output geometry based at least in part on the cluster of geometries and a number of geometries in each cluster of the cluster of geometries, determining one or more partitions for the output geometry based on the cluster of geometries and the number of geometries in each cluster of the cluster of geometries, dynamically change a size of the one or more partitions for the output geometry, and transmitting the output geometry associated with the continuous data stream.

9 Claims, 13 Drawing Sheets

(51) Int. Cl.
*G06F 16/22* (2019.01)
*G06F 16/23* (2019.01)
*G06F 16/901* (2019.01)
*H04W 4/021* (2018.01)

(52) U.S. Cl.
CPC .......... *G06F 16/2365* (2019.01); *G06F 16/29* (2019.01); *G06F 16/9024* (2019.01); *H04W 4/021* (2013.01)

(56) References Cited

U.S. PATENT DOCUMENTS

| | | | |
|---|---|---|---|
| 9,412,278 B1* | 8/2016 | Gong | G06F 16/29 |
| 9,514,133 B1 | 12/2016 | Kursun | |
| 10,275,492 B2 | 4/2019 | Park et al. | |
| 2006/0155679 A1 | 7/2006 | Kothuri et al. | |
| 2011/0161328 A1 | 6/2011 | Park et al. | |
| 2012/0317198 A1 | 12/2012 | Patton et al. | |
| 2014/0067801 A1 | 3/2014 | Marvit et al. | |
| 2014/0176588 A1* | 6/2014 | Duluk, Jr. | G09G 5/001 345/541 |
| 2015/0095333 A1 | 4/2015 | Porpora et al. | |
| 2015/0095355 A1* | 4/2015 | Patton | G06F 16/29 707/754 |
| 2015/0148077 A1* | 5/2015 | Jelle | H04W 4/021 455/456.3 |
| 2015/0163629 A1* | 6/2015 | Cheung | H04W 4/021 455/456.1 |
| 2015/0242648 A1* | 8/2015 | Lemmey | G06F 21/62 726/30 |
| 2015/0339911 A1* | 11/2015 | Coyne | G08B 23/00 340/517 |
| 2016/0049014 A1* | 2/2016 | Wells | G07B 15/02 705/13 |
| 2016/0057575 A1* | 2/2016 | Chang | H04W 4/021 455/414.2 |
| 2016/0070761 A1* | 3/2016 | Viel | G06F 16/24568 707/713 |
| 2016/0144817 A1 | 5/2016 | Chambers | |
| 2016/0195602 A1* | 7/2016 | Meadow | G01S 5/0294 701/517 |
| 2016/0241997 A1* | 8/2016 | Lucas | H04W 4/021 |
| 2016/0266258 A1* | 9/2016 | Huang | G01S 19/34 |
| 2018/0075109 A1 | 3/2018 | Park et al. | |

OTHER PUBLICATIONS

Avci et al., "Managing evolving shapes in sensor networks", Scientific and Statistical Database Management, ACM, 2 Penn Plaza, Suite 701 New York NY 10121-0701 USA,, Jun. 30, 2014, pp. 1-12.
Patroumpas et al., "Online Event Recognition from Moving Vessel Trajectories", Arxiv.org, Cornell University Library, 201 Olin Library Cornell University Ithaca, NY 14853., Jan. 22, 2016, pp. 1-35.
"International Search Report and Written Opinion" issued in PCT/US2017/051868, dated Nov. 27, 2017, 16 pages.
"International Search Report" issued in PCT/US2017/051878, dated Nov. 27, 2017, 11 pages.
U.S. Appl. No. 15/705,406, Notice of Allowance dated Jan. 3, 2019, 15 pages.

* cited by examiner

AUTOMATIC PARALLELIZATION FOR GEOFENCE APPLICATIONS

CROSS-REFERENCES TO RELATED APPLICATIONS

The present application claims priority and benefit from U.S. Provisional Application No. 62/395,204, filed Sep. 15, 2016, entitled "AUTOMATIC PARALLELIZATION FOR GEOFENCE APPLICATIONS," the entire contents of which are incorporated herein by reference for all purposes.

This application is related to application Ser. No. 15/705,406, filed on the same day herewith, entitled "SPATIAL CHANGE DETECTOR AND CHECK AND SET OPERATION," the entire contents of which are hereby incorporated by reference as if fully set forth herein.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for processing events of an event stream. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for dynamically determining a size of a partition, including: receiving, by a computing device, a continuous data stream related to an application. The method also includes identifying, by the computing device, an input geometry associated with the continuous data stream, the input geometry specifying a region in the continuous data stream to be partitioned. The method also includes generating, by the computing device, a cluster of geometries based at least in part on the input geometry. The method also includes generating, by the computing device, an output geometry based at least in part on the cluster of geometries and a number of geometries in each cluster of the cluster of geometries. The method also includes determining, by the computing device, one or more partitions for the output geometry based on the cluster of geometries and the number of geometries in each cluster of the cluster of geometries. The method also includes dynamically, by the computing device, changing a size of the one or more partitions for the output geometry. The method also includes transmitting, by the computing device, the output geometry associated with the continuous data stream. Other embodiments of this aspect include corresponding computer systems, apparatus, and computer programs recorded on one or more computer storage devices, each configured to perform the actions of the methods.

Implementations may include one or more of the following features. The method where the determining the one or more partitions for the output geometry includes detecting a change in the cluster of geometries. The method where the detecting the change in the cluster of geometries includes: loading a bound box of the cluster of geometries to an index; comparing the cluster of geometries other cluster of geometries within the index; and determining whether the cluster of geometries has changed from the other cluster of geometries within the index. The method where the detecting the change in the cluster of geometries further includes: when the cluster of geometries is not found from the index, a determination is made that the cluster of geometries is a new cluster; and when the cluster of geometries is found from the index, a determination is made that the cluster of geometries is an existing cluster. The method where the detecting the change in the cluster of geometries further includes: when the cluster of geometries is the new cluster, one or more partitions for the output geometry is determined based on the cluster of geometries and the number of geometries in each cluster of the cluster of geometries without one or more parameters from the other cluster of geometries; and when the cluster of geometries is the existing cluster, a size threshold value is identified to dynamically change the size of the one or more partitions for the output geometry. The method where the changing the size of the one or more partitions includes determining a grid range, creating a grid index to partition index table, and setting the grid index to partition index table to a cluster object stored in index such that the cluster object can be used in assigning a partition identifier. The method where the decision of the grid range is implemented by a configuration parameter, a grid size, a grid size effect factor, and the number of geometries in each cluster of the cluster of geometries. Implementations of the described techniques may include hardware, a method or process, or computer software on a computer-accessible medium.

One general aspect includes a system, including: a memory configured to store computer-executable instructions; and a processor configured to access the memory and execute the computer-executable instructions to. The system also includes receive a continuous data stream related to an application. The system also includes identify an input geometry associated with the continuous data stream, the input geometry specifying a region in the continuous data stream to be partitioned. The system also includes generate a cluster of geometries based at least in part on the input geometry. The system also includes generate an output geometry based at least in part on the cluster of geometries and a number of geometries in each cluster of the cluster of geometries. The system also includes determine one or more partitions for the output geometry based on the cluster of geometries and the number of geometries in each cluster of the cluster of geometries. The system also includes dynamically change a size of the one or more partitions for the output geometry. The system also includes transmit the output geometry associated with the continuous data stream. Other embodiments of this aspect include corresponding computer systems, apparatus, and computer programs recorded on one or more computer storage devices, each configured to perform the actions of the methods.

Implementations may include one or more of the following features. The system where the determining the one or more partitions for the output geometry includes detecting a change in the cluster of geometries. The system where the detecting the change in the cluster of geometries includes: loading a bound box of the cluster of geometries to an index; comparing the cluster of geometries other cluster of geometries within the index; and determining whether the cluster of geometries has changed from the other cluster of geometries within the index. The system where the detecting the change in the cluster of geometries further includes: when the cluster of geometries is not found from the index, a determination is made that the cluster of geometries is a new cluster; and when the cluster of geometries is found from the index, a determination is made that the cluster of geometries is an existing cluster. The system where the detecting the change in the cluster of geometries further includes: when the cluster of geometries is the new cluster, one or more partitions for the output geometry is determined based on the cluster of geometries and the number of geometries in each cluster of the cluster of geometries without one or more parameters from the other cluster of geometries; and when the cluster of geometries is the existing cluster, a size threshold value is identified to dynamically change the size of the one or more partitions for the output geometry. The system where the changing the size of the one or more partitions includes determining a grid range, creating a grid index to partition index table, and setting the grid index to partition index table to a cluster object stored in index such that the cluster object can be used in assigning a partition identifier. The system where the decision of the grid range is implemented by a configuration parameter, a grid size, a grid size effect factor, and the number of geometries in each cluster of the cluster of geometries. Implementations of the described techniques may include hardware, a method or process, or computer software on a computer-accessible medium.

One general aspect includes a computer-readable medium storing computer-executable code that, when executed by a processor, cause the processor to perform operations including: receiving a continuous data stream related to an application. The computer-readable medium also includes identifying an input geometry associated with the continuous data stream, the input geometry specifying a region in the continuous data stream to be partitioned. The computer-readable medium also includes generating a cluster of geometries based at least in part on the input geometry. The computer-readable medium also includes generating an output geometry based at least in part on the cluster of geometries and a number of geometries in each cluster of the cluster of geometries. The computer-readable medium also includes determining one or more partitions for the output geometry based on the cluster of geometries and the number of geometries in each cluster of the cluster of geometries. The computer-readable medium also includes dynamically changing a size of the one or more partitions for the output geometry. The computer-readable medium also includes transmitting the output geometry associated with the continuous data stream. Other embodiments of this aspect include corresponding computer systems, apparatus, and computer programs recorded on one or more computer storage devices, each configured to perform the actions of the methods.

Implementations may include one or more of the following features. The computer-readable medium where the determining the one or more partitions for the output geometry includes detecting a change in the cluster of geometries. The computer-readable medium where the detecting the change in the cluster of geometries includes: loading a bound box of the cluster of geometries to an index; comparing the cluster of geometries other cluster of geometries within the index; and determining whether the cluster of geometries has changed from the other cluster of geometries within the index. The computer-readable medium where the detecting the change in the cluster of geometries further includes: when the cluster of geometries is the new cluster, one or more partitions for the output geometry is determined based on the cluster of geometries and the number of geometries in each cluster of the cluster of geometries without one or more parameters from the other cluster of geometries; and when the cluster of geometries is the existing cluster, a size threshold value is identified to dynamically change the size of the one or more partitions for the output geometry. The computer-readable medium where the changing the size of the one or more partitions includes determining a grid range, creating a grid index to partition index table, and setting the grid index to partition index table to a cluster object stored in index such that the cluster object can be used in assigning a partition identifier. The computer-readable medium where the decision of the grid range is implemented by a configuration parameter, a grid size, a grid size effect factor, and the number of geometries in each cluster of the cluster of geometries. Implementations of the described techniques may include hardware, a method or process, or computer software on a computer-accessible medium.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
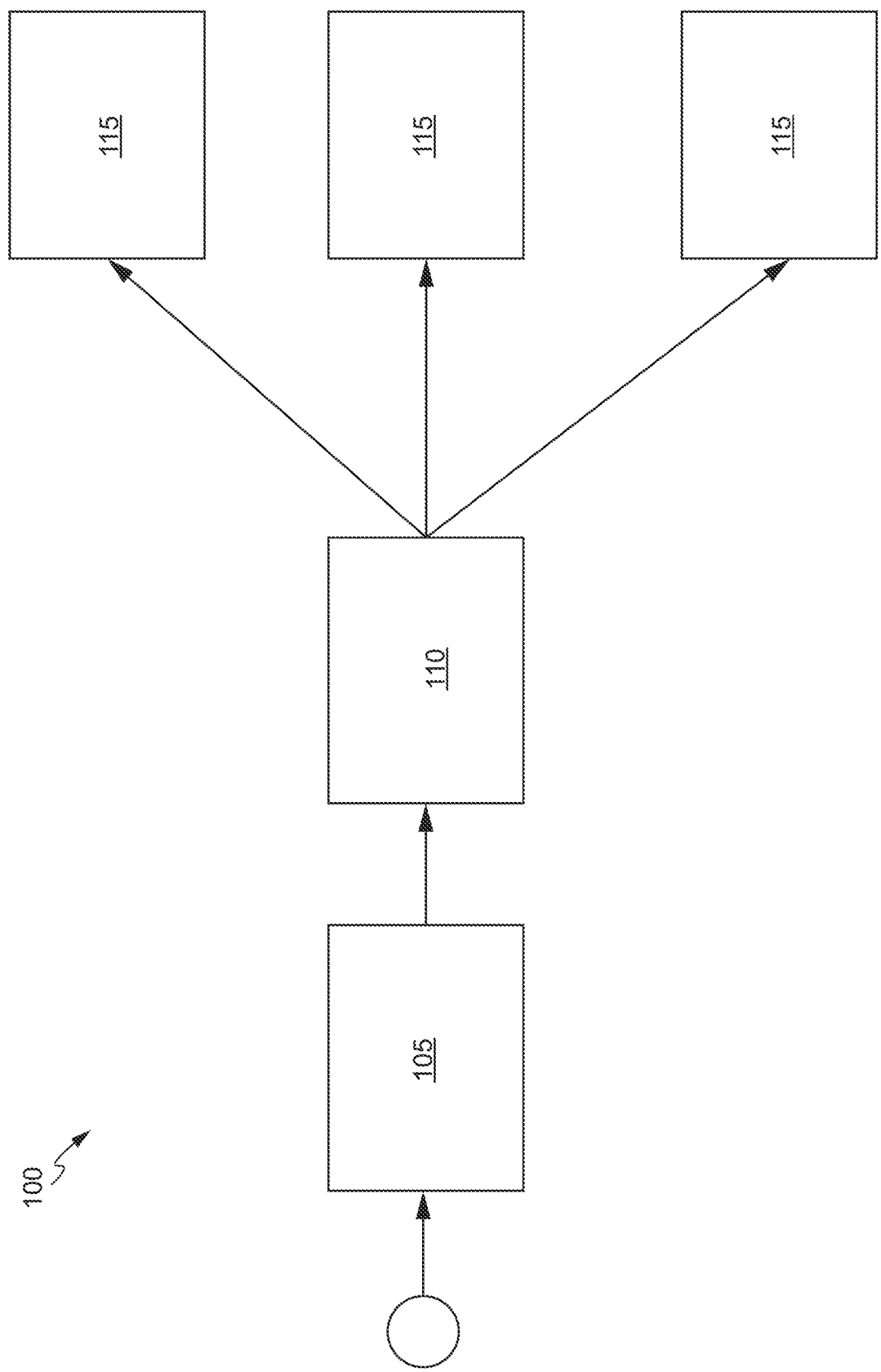
FIG. 1 depicts aspects of an example event processing system architecture that provides an environment by which an event processing application can be processed for different execution environments in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
   (<timestamp_N>, <NVDA,4>)
   (<timestamp_N+1>, <ORCL,62>)
   (<timestamp_N+2>, <PCAR,38>)
   (<timestamp_N+3>, <SPOT, 53>)
   (<timestamp_N+4>, <PDCO,44>)
   (<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like:

RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation. At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Automatic Parallelism for Geo-Fence Based Applications

In applications such as automobile traffic monitoring, data is in the form of continuous data streams. A continuous data stream is a stream of data that arrives at a stream processing server with no explicit end range. By processing the continuous data streams, applications can detect complex patterns, event correlations, and relationships between events. For example, a continuous data stream might have information about automobiles that pass a particular section on a highway. An automobile can send coordinates continuously. Based upon this data stream, problems such as detecting buddies close to an automobile's position in the situation where a solution needs to handle an "m" to "n" relation between the number of vehicles and buddies using other vehicles and when the number of vehicles are in range of millions may be solved.

The spatial data support in the traditional database systems and data processing algorithms are typically designed to process spatial data stored as finite stored data sets. Traditional database systems store data in database tables where the data may be queried and manipulated using a data management language such as SQL. However, database management systems and algorithms are unable to handle continuous data streams of geometries because they are designed based upon the assumption that the system stores a large, but finite collection of data.

Due to the limitation of memory resources, only a limited number of moving objects can be supported by a single application. In order to solve the scalability problem, clustering can be used. However, simple clustering cannot solve the problem of certain use cases such as the buddy detection problem described above, because there typically requires some overlapping of supported regions among the processing nodes.

Previous approaches have used a geo-partitioner to solve the above problem. The geo-partitioner is typically based on a grid-based approach where the range is divided with pre-defined distances or a region based approach where the geometries specify the region to partition the input geometries. This approach is a static approach where the partition is static and cannot incorporate the change of moving objects in a partition. For example, this approach may not accommodate the scenario with a sudden increase of number of moving objects in a grid, for example, an increase in the number of taxis when a ball game at a stadium ends.

In certain embodiments, a dynamic grid is generated based on a spatial clustering algorithm such as K-Means or DBSPAN. FIG. 1 depicts an example dynamic grid system or architecture 100 in which techniques for dynamically determining the size of a partition using a spatial clustering algorithm may be implemented. In various embodiments, the dynamic grid system or architecture 100 comprises the following components: a Spatial Cluster Generator (SCG) 105, a Cluster based Partitioner (CBP) 110, and a Spatial Query Processor (SQP) 115. The Spatial Cluster Generator 105 component may be configured to continuously run a spatial cluster algorithm such as K-Means or DBSCAN incrementally and create clusters of geometries from input geometries. The output (cluster geometry and number of geometries in the cluster) may be sent to the Cluster based Partitioner 110. The Cluster based Partitioner 110 component may be configured to partition the input geometry and determine which geometry goes to which partition. In some embodiments, the Cluster based Partitioner 110 has a role of dynamically changing the partition size. The Spatial Query Processor 115 component handles spatial queries. One example is CQLEngine with Spatial Cartridge. Each Spatial Query Processor 115 component may be configured to handle one or more partitions. The one or more of the components depicted in FIG. 1 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 2:
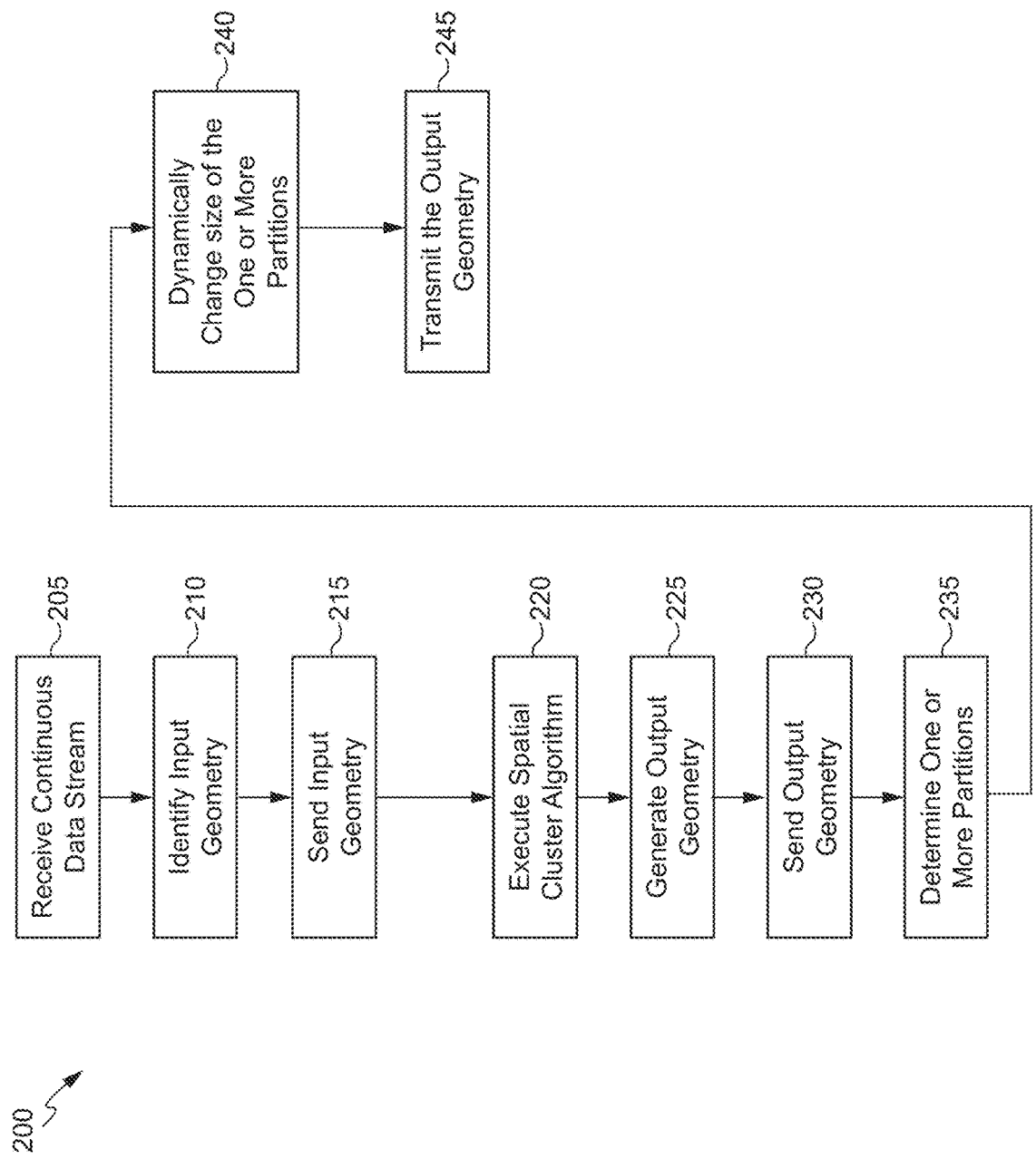
FIG. 2 is an example flow diagram of an overall workflow in accordance with an embodiment of the present disclosure.
Figure 3:
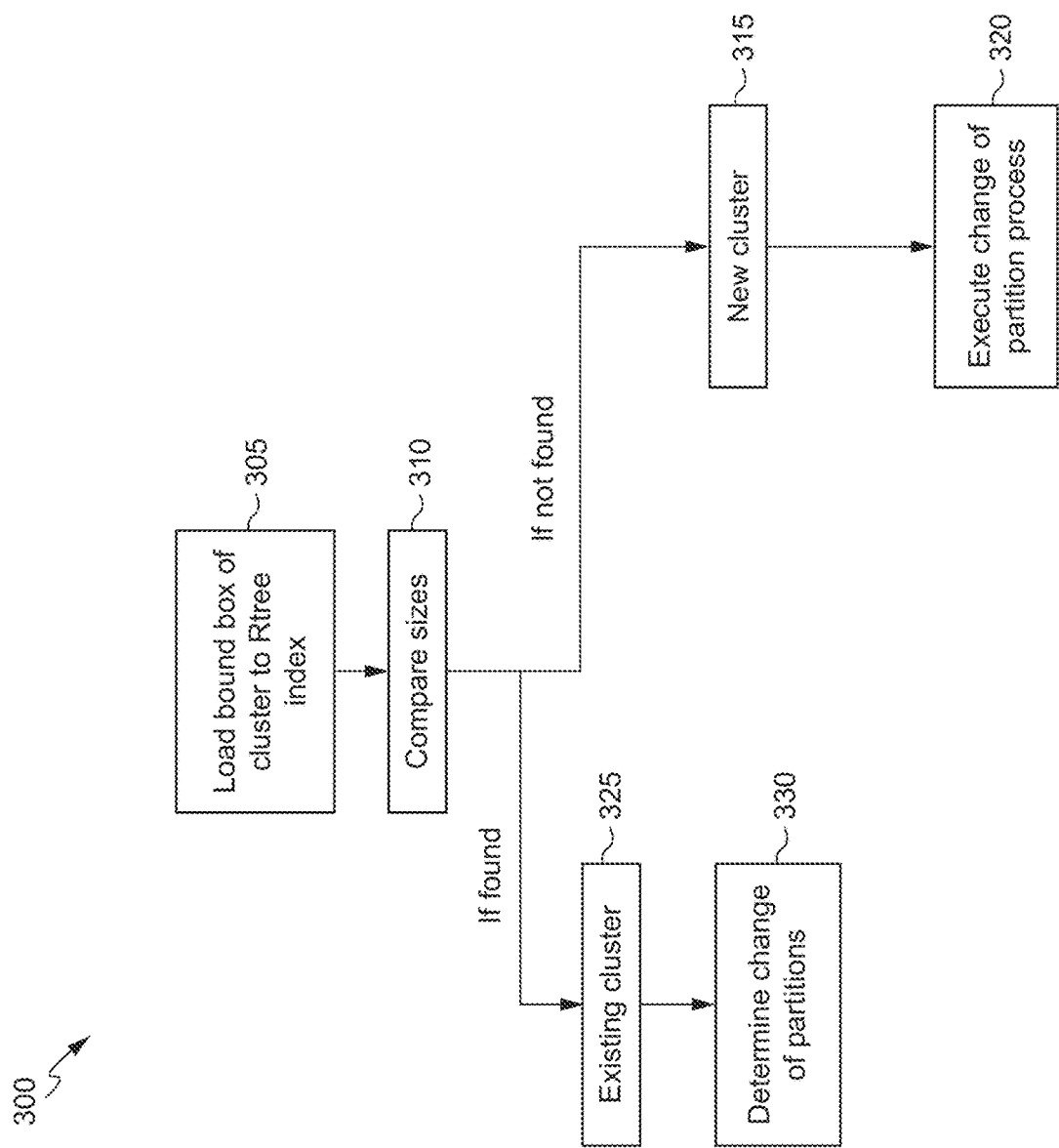
FIG. 3 is an example flow diagram of a cluster change detection process in accordance with an embodiment of the present disclosure.
Figure 4:
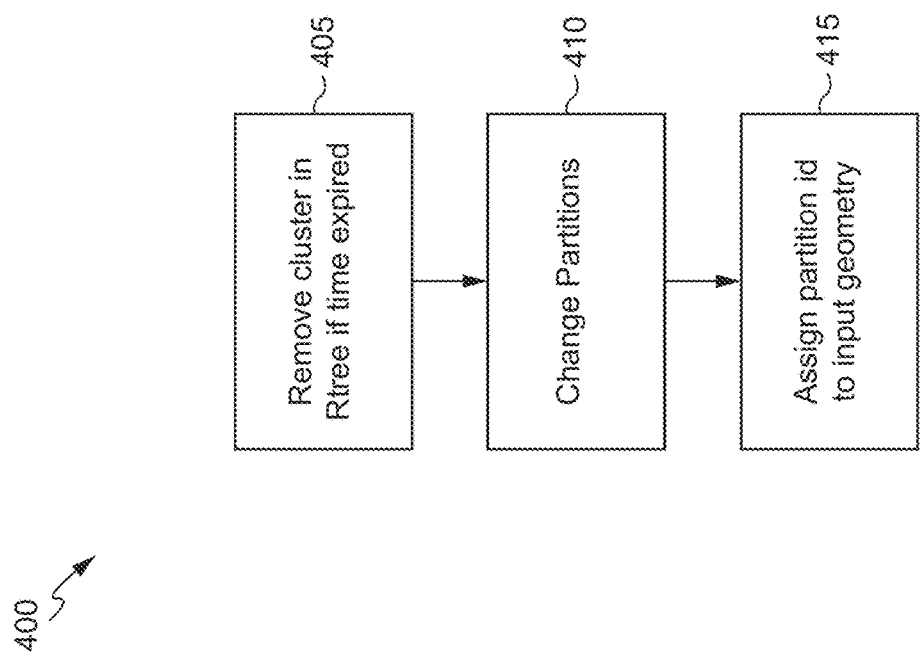
FIG. 4 is an example flow diagram of a cluster removal process, a change of partitions process, and assignment of a partition identifier process in accordance with an embodiment of the present disclosure.

FIGS. 2-4 illustrate techniques for dynamically determining the size of a partition using a spatial clustering algorithm according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 2-4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 2-4 is not intended to be limiting. Other sequences of steps may also be performed according to alternative embodiments. For example, in alternative embodiments the steps outlined above may be performed in a different order. Moreover, the individual steps illustrated in FIGS. 2-4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 2 shows a flowchart 200 that illustrates an overall workflow implemented by embodiments of the present disclosure. In some embodiments, the processes depicted in flowchart 200 may be implemented by the dynamic grid system or architecture 100 of FIG. 1. At step 205, a continuous data stream related to an application may be received. At step 210, an input geometry associated with the continuous data stream may be identified. The input geometry may specify a region in the continuous data stream to be partitioned. At step 215, the input geometries may be sent to the SCG. At step 220, the SCG may execute an incremental Spatial Cluster algorithm on the input geometry to generate a cluster of geometries based at least in part on the input geometry. At step 225, an output geometry may be generated by the SCG based at least in part on the cluster of geometries and a number of geometries in each cluster of the cluster of geometries. At step 230, the SCG may send the output geometry to the CBP. At step 235, the CBP may use the cluster of geometries and a number of geometries from the SCG to determine one or more partitions for the output geometry. In some embodiments, the CBP's partition algorithm may include the following processes: (i) cluster change detection, (ii) cluster removal, (iii) change of partitions, and (iv) assignment of a partition identifier to input geometry. These processes are described in more detail below. At step 240, a size of the one or more partitions for the output geometry may be dynamically changed. At step 245, the output geometry associated with the continuous data stream may be transmitted with the size of the one or more partitions dynamically changed.

FIG. 3 shows a flowchart 300 that illustrates a cluster change detection process of the CBP implemented by embodiments of the present disclosure. In some embodiments, the processes depicted in flowchart 300 may be implemented by the dynamic grid system or architecture 100 of FIG. 1. In certain embodiments, a determination may be made as to whether there are changes in the clusters using an index such as the RTree index to detect the changes of clusters. The RTree index or an R-tree is a tree data structure used for spatial access methods, i.e., for indexing multi-dimensional information such as geographical coordinates, rectangles or polygons. At step 305, a bound box of the cluster may be loaded to RTree. At step 310, a look up of the output cluster in the RTree index may be performed to compare the sizes. For example, a bound box of the cluster of geometries may be loaded to an index and the cluster of geometries may be compared to other cluster of geometries within the RTree index. The comparison may be performed based on one or more parameters includes size of the clusters. At step 315, if the cluster is not found from the index, a determination may be made that the cluster is a new cluster. At step 320, when the cluster is a new cluster, a change of partition process may be executed without the old cluster size. At step 325, if the cluster is found from the index, a determination may be made that the cluster is not a new cluster (e.g., existing clusters). At step 330, when the cluster is not a new cluster, a size threshold value may be identified to determine a change of partitions. For example, if the size change is X percent, then a change of partition process may be executed with the X percent.

FIG. 4 shows a flowchart 400 that illustrates a cluster removal process, a change of partitions process, and assignment of a partition identifier process as implemented by embodiments of the present disclosure. In some embodiments, the processes depicted in flowchart 400 may be implemented by the dynamic grid system or architecture 100 of FIG. 1. At step 405, the cluster in RTree may be removed if no cluster is found from SCG for a predetermined time with a timer. At step 410, the partitions may be changed, which may involve deciding the grid range, creating a grid index to partition index table, and setting the grid index to partition index table to a cluster object stored in RTree so that the cluster object can be used in assigning a partition identifier. The decision of a grid range may be implemented by a configuration parameter, GridSize, SizeEffectFactor, and the number of geometries given from SCG. In an example, the GridSize may be adjusted using the number of geometries by applying equation (GridSize/(number of geometries*SizeEffectFactor). The bounding box of cluster may be divided by the adjusted GridSize and this creates new partitions or adds additional partitions. In an example, the partition identifier may be created using a consistent hashing technique to maintain the system load-balanced. Since the grid index does not directly map to partition id, a look up table may be used, in some embodiments, to map the grid index to partition id. In certain embodiments, the cluster removal algorithm may further include the assignment of partition Id to input geometry. The assignment of a partition identifier may be performed by searching of the cluster in RTree, finding the grid by range comparison, and performing a look up to the grid index to partition the index table. Thus, embodiments of the present disclosure provide a technique for dynamically determining the size of a partition using a spatial clustering algorithm that combines spatial clustering and grid partitioning. Further, techniques are disclosed to dynamically change partitions and grid sizes from a stream of geometry.

Figure 5:
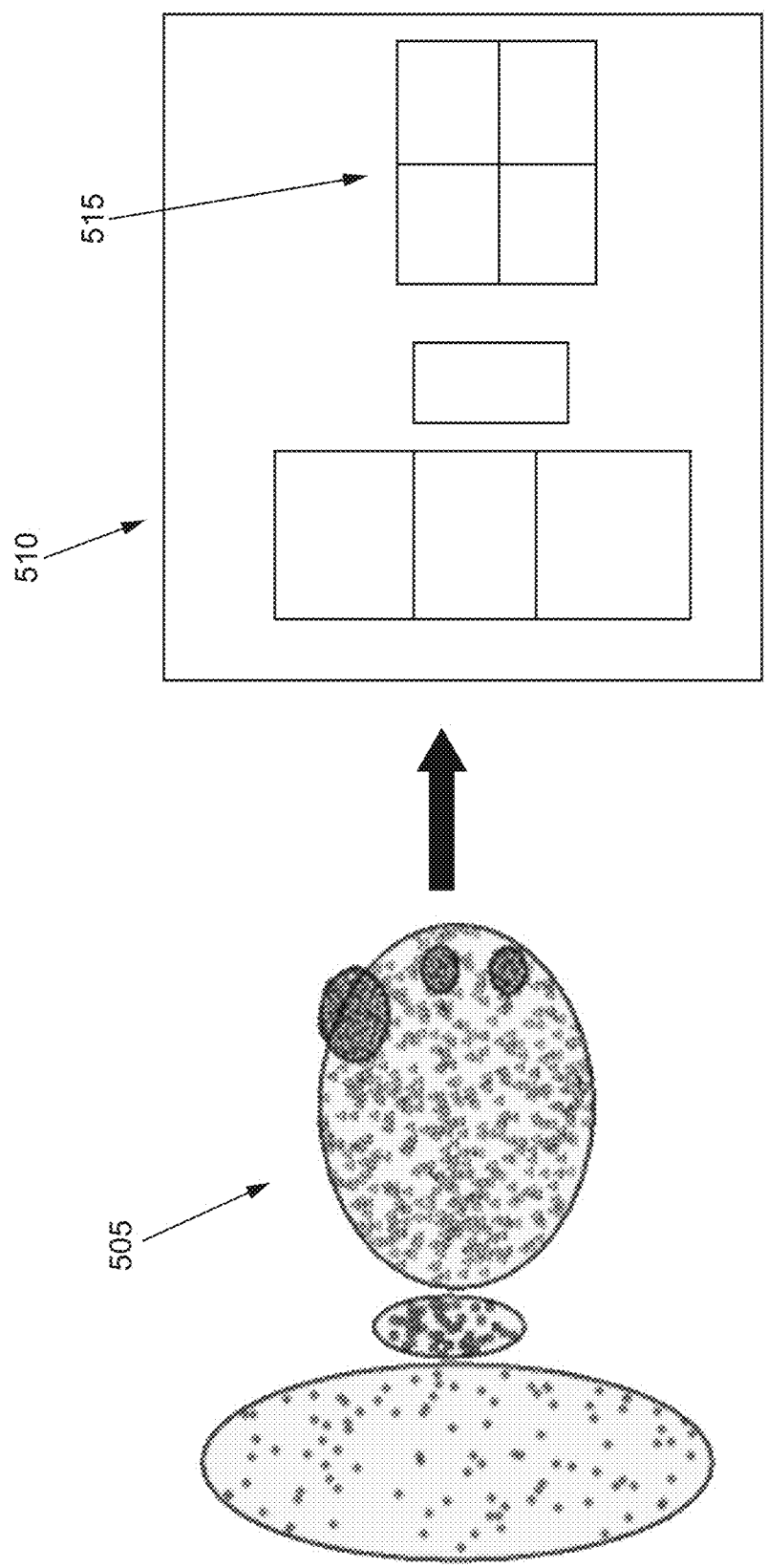
FIG. 5 is an illustration of input geometry, an index, and grid, in accordance with an embodiment of the present disclosure.

FIG. 5 is an exemplary illustration of a cluster of geometries generated based at least in part on the input geometry

505, an index 510 such as an Rtree in which the input geometry 505 may be loaded, and grid 515 including a grid range and a grid index to partition index table, that is set to the cluster object stored in the index 510 in accordance with an embodiment of the present disclosure.

Spatial Change Detector and Check and Set Operation in Spark Streaming

Embodiments of the present disclosure provide a technique to perform proximity detection and checking of moving objects in a stream. In various embodiments, a spatial change detector is disclosed that can track moving objects and can create alerts when two or more moving objects are within proximity with each other. For example, the spatial change detector can track moving objects in an Airport and make sure they do not come in proximity of a given range.

Figure 6:
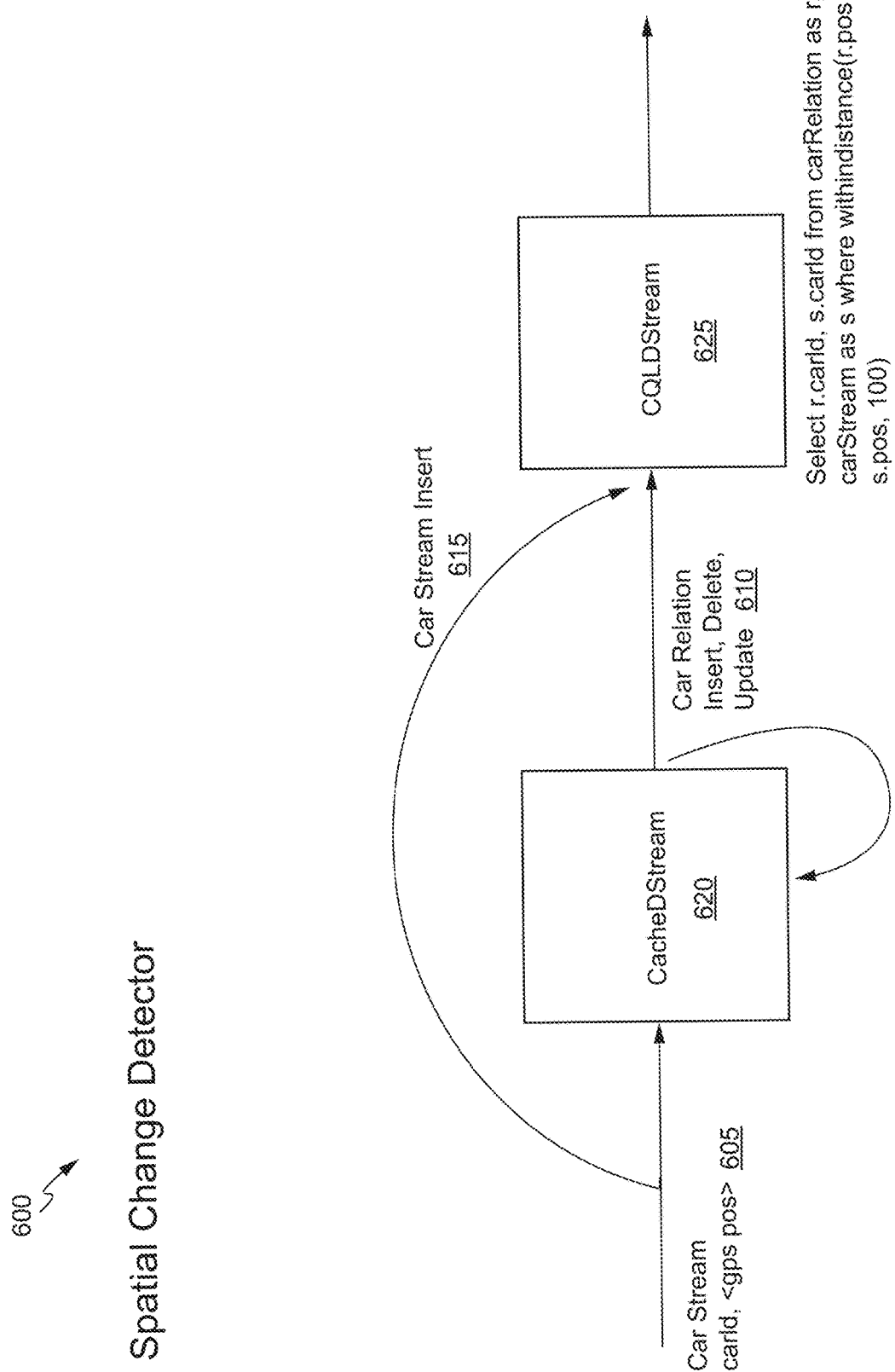
FIGS. 6 and 7 are illustrations of techniques to perform proximity detection and checking of moving objects in a stream in accordance with an embodiment of the present disclosure.

In some embodiments, the tracking of moving objects may be implemented using a spatial 'withindistance' operation. However, if the moving objects are part of a stream, distances of n! of combinations from the self-join of the moving object stream have to be calculated. Calculating the distance of two locations from the GPS can be a relatively heavy point operation. One solution implemented by embodiments of the present disclosure is to utilize a spatial change detector 600 as shown in FIG. 6 that converts the geometry of the stream 605 (e.g., data concerning the global position of a vehicle) into a relation 610 and performs a join operation 615 between the stream 605 and the relation 610. The join operations, which may be among the possible TableExpressions in a FROM clause, perform joins between two sets of data or tables. This enables leveraging a spatial index from the relation and avoids calculating the distance of n! combinations. A spatial index is a type of extended index that allows a spatial column to be indexed. A spatial column is a table column that contains data of a spatial data type, such as geometry or geography. When a spatial index is leveraged, a filter can be applied with the range, and the distance can be calculated from the filtered result. This results in an n square operation. In order to convert a stream 605 to a relation 610, a change of contents for a same key may be detected. In an embodiment, an in-memory cache 620 supporting insert, delete, and update operations may be used to detect if there is a change of content, issue an 'update' event, and convert the stream 605 into a relation 610. An in-memory cache 620 such as a HashMap may be designed to increase application performance by holding frequently-requested data in memory, reducing the need for database queries to get that data. Thereafter, the stream 605 and the relation 610 can be used in a spatial 'withindistance' operation 625 to track relation of the moving objects to one another and perform proximity detection. Spatial operations such as 'withindistance' use geometry functions to take spatial data as input, analyze the data, then produce output data that is the derivative of the analysis performed on the input data.

In some embodiments, a check and set operation may be implemented. For instance, when there is a request and match operation against a stream of objects (for example, while dispatching a taxi from a passenger request), it requires arbitration from the matching. For the above example, from the passenger request stream, the taxi within a particular range can be determined. Once the candidate taxi has been found, one of taxis need to be picked and marked 'booked' so that other passengers can avoid double-booking of the same taxi. Since CQL is a query language and not a procedural language, the checking and setting operations cannot be performed at the same time.

Figure 7:
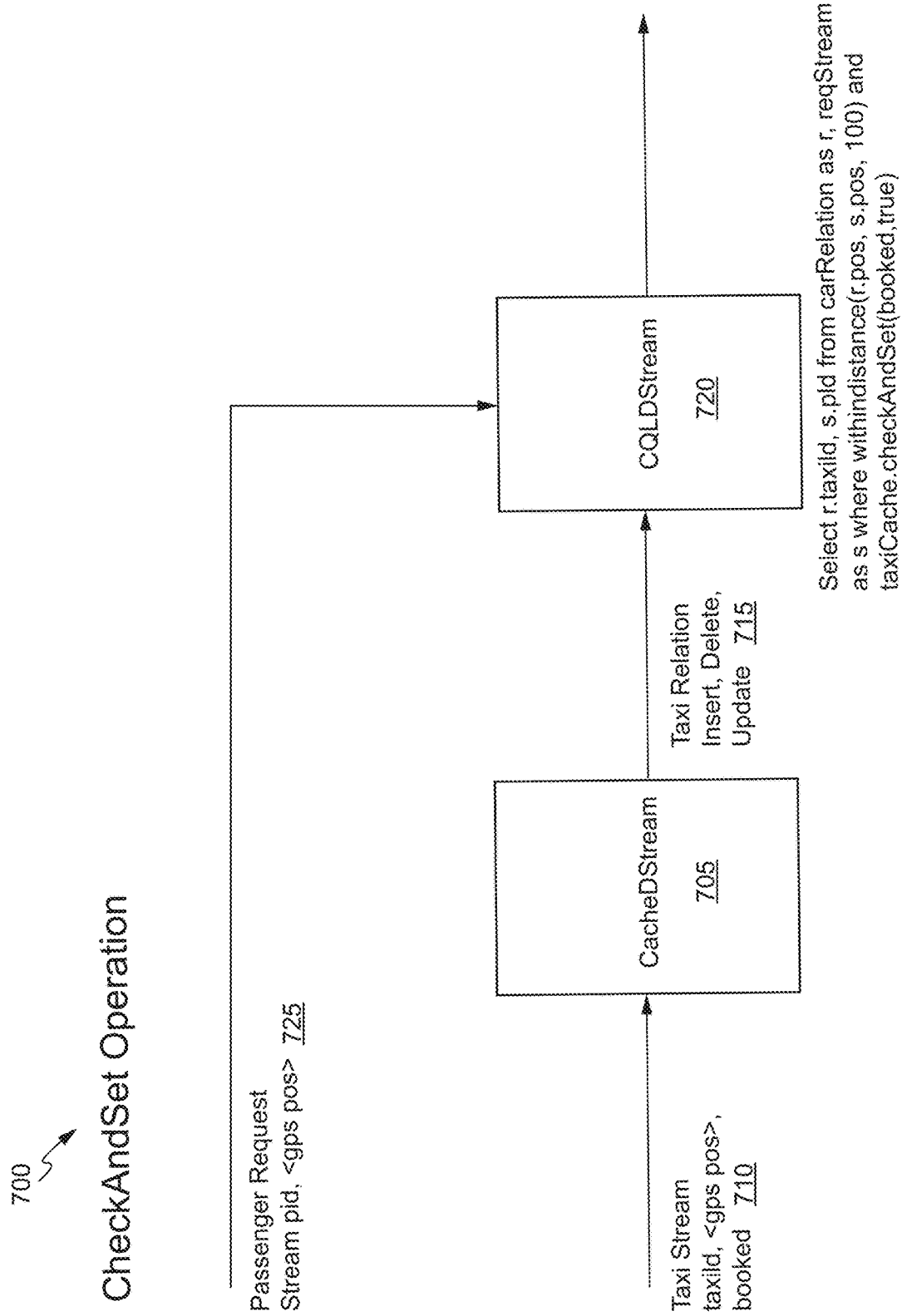

One way to support such a check and set operation is to use an in-memory cache (or a HashMap). Similar to the Test-and-set or Compare-and-swap that is used as an atomic operation for concurrency, a set (CheckAndSet) detector 700 as shown in FIG. 7 supported by an in-memory cache 705 may be configured to convert the geometry of a first stream 710 (e.g., data concerning the global position of a vehicle) into a relation 715 and perform a check and set operation 720 between the relation 715 and a second stream 725 (e.g., data concerning the global position of a request). This enables leveraging a spatial index from the relation and avoids calculating the distance of n! combinations. When a spatial index is leveraged, a filter can be applied with the range, and the distance can be calculated from the filtered result. This results in an n square operation. In order to convert the first stream 710 to a relation 715, a change of contents for a same key may be detected. In an embodiment, the in-memory cache 705 supporting insert, delete, and update operations may be used to detect if there is a change of content, issue an 'update' event, and convert the first stream 710 into a relation 715. Thereafter, the relation 715 and the second stream 725 can be used in a check and set operation 720 such that data from the first stream 710 is checked against data from the second stream 725 (e.g., a taxi may be picked that is near the location of the passenger request) and property of an entry object is set (e.g., the taxi is marked 'booked' so that other passengers can avoid double-booking). In certain embodiments, a select statement such as 'select passengerId, taxiId from taxiRelation, requestStream where taxiCache.checkAndSet ('booked', true)' can be used to check if a 'booked' property of an entry object is 'false' in taxiCache and set the 'booked' property to true, and return true, and apply a filter to the result while creating a side effect of changing the entry.

In various embodiments, the check and set operation may involve using an in-memory cache (or a HashMap) and may be implemented as follows:

```
Add CacheDStream and CacheRDD
CQLEngine creates a singleton Cache.
CQLEngine adds RPC operation of Cache methods through delegation.
CacheRDD should be co-partitioned to CQLEngine.
CacheRDD delegates cache operations to CQLEngine through Cache RPC
operation
Cache - normal operation for change detection
if (get(key) == null) {
    put
    add(new TupleValue(PLUS, ...))
} else {
    put
    add(new TupleValue(UPDATE, ...)
}
if (expiredTupleQueue.size > 0) {
    remove all tuples from the queue and remove
    add(new TupleValue(MINUS, ...)
}
Cache starts a timer to self-expire tuples and add expired tuples into a
queue, expiredTupleQueue
Cache also have a CheckAndSet operation
value = get(key)
if (value.getProperty(property) != newValue)
    value.setProperty(property, newValue)
    return true
else return false
```

Thus, using the above techniques, the disclosed spatial change detector enables the spatial 'withindistance' operation against a geometry data stream to be performed faster and the disclosed check and set operation enables arbitration to be provided with CQL. Using the above techniques, geo-streaming use cases such as proximity checking of moving objects and request-dispatching systems can be implemented.

Figure 8:
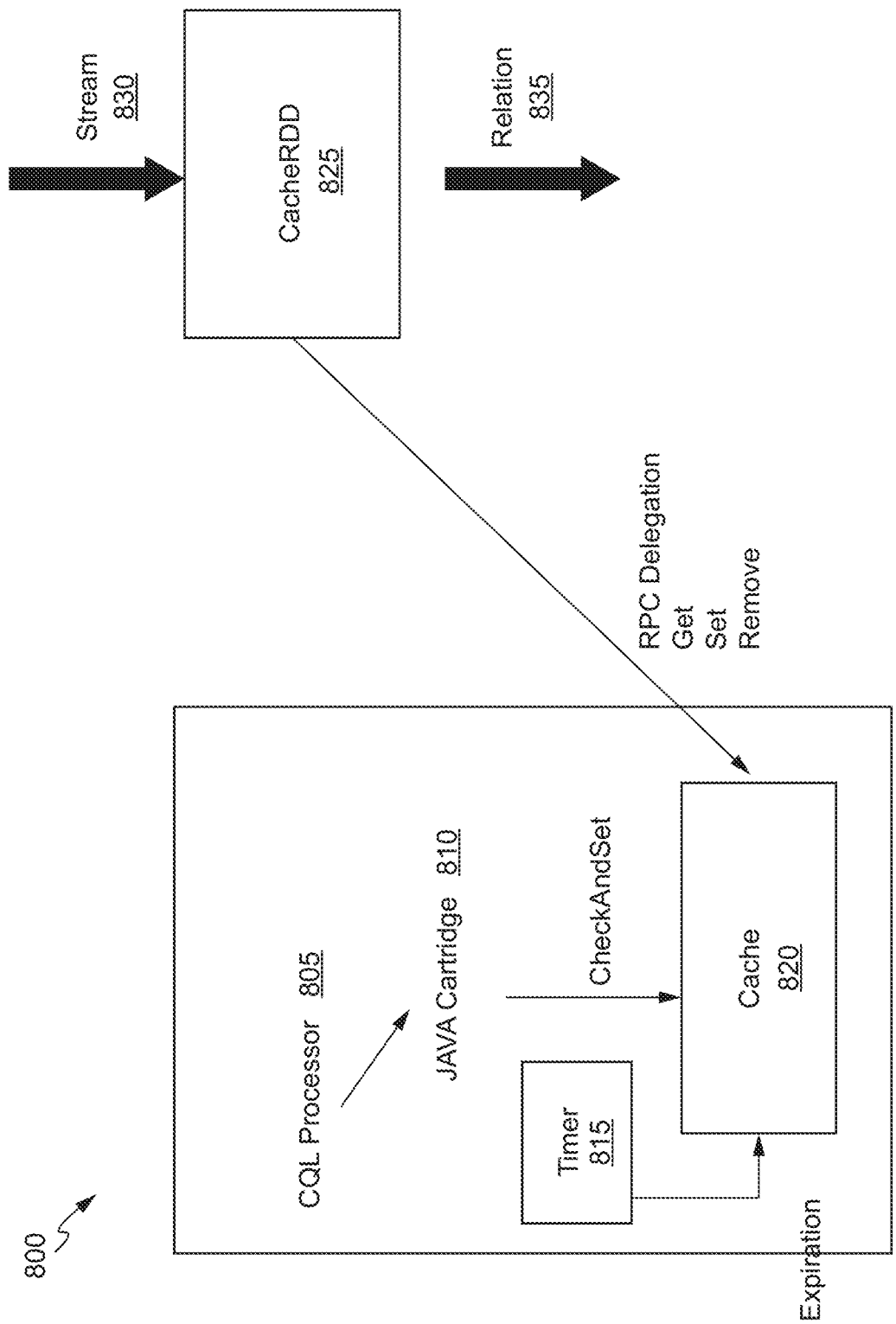
FIG. 8 is an illustration of an example system or architecture in which techniques for performing proximity detection and checking of moving objects in a stream and a check and set operation may be implemented in accordance with an embodiment of the present disclosure.

FIG. 8 depicts an example system or architecture in which techniques for performing proximity detection and checking of moving objects in a stream and a check and set operation may be implemented. In some embodiments, an event processing service or system 800 that is configured to provide an environment for processing event streams includes a CQL processor 805, a JAVA cartridge 810, a timer 815, an in-memory cache 820, and a CacheRDD 825. The CQL processor 805 may be associated with one or more CQL queries that operate on the events offered by the input channel. The CQL processor is connected to an output channel to which query results are written. The timer 815 may be used to organize and remove expired data from the in-memory cache 820. The CacheRDD 825 may receive a data stream 830 and utilizes in-memory cache 820 to convert the data stream into a relation 835, as discussed herein with respect to at least FIGS. 6 and 7.

Figure 9:
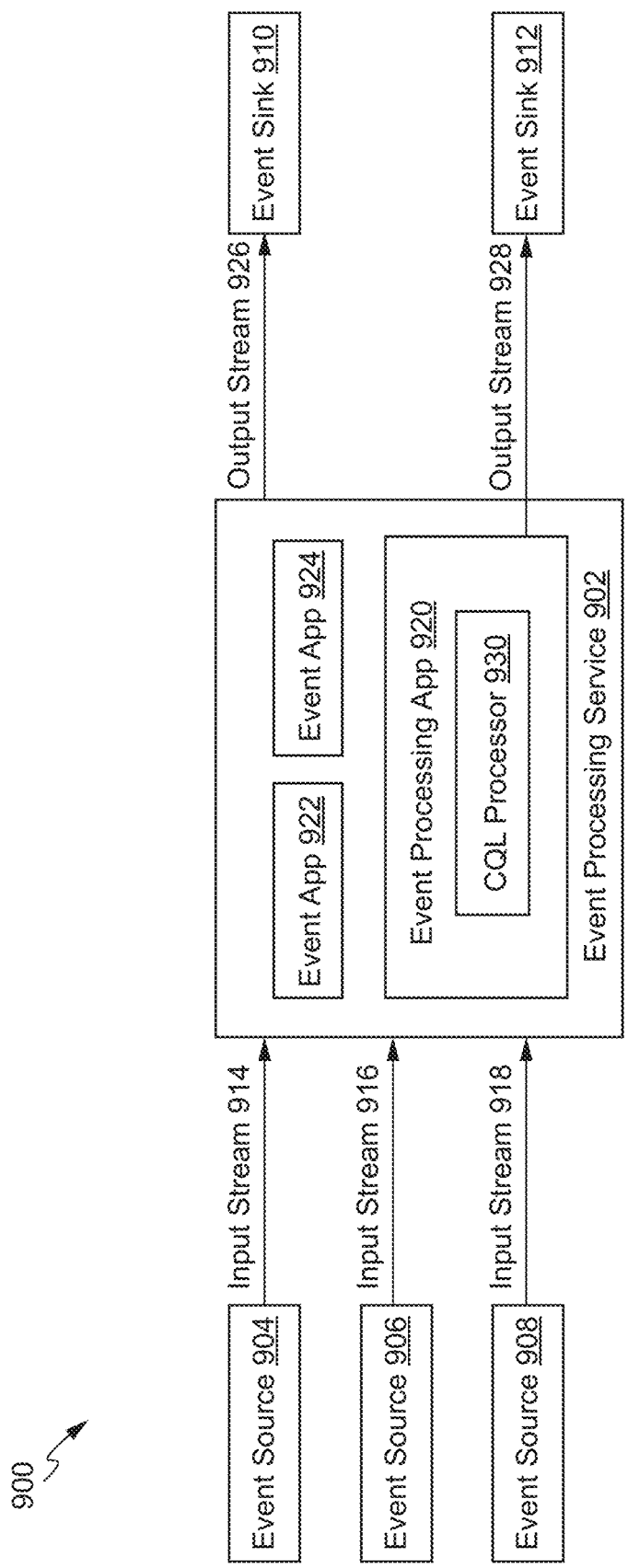
FIG. 9 is an illustration of a simplified high level diagram of an event processing system in accordance with an embodiment of the present disclosure.

FIG. 9 depicts a simplified high level diagram of an event processing system 200 that may incorporate an embodiment of the present disclosure. In some embodiments, event processing system 900 may comprise one or more event sources (904, 906, 908), an event processing service (EPS) 902 (also referred to as CQ Service 902) that is configured to provide an environment for processing event streams, and one or more event sinks (910, 912). The event sources generate event streams that are received by EPS 902. EPS 902 may receive one or more event streams from one or more event sources. For example, as shown in FIG. 9, EPS 902 receives a first input event stream 914 from event source 904, a second input event stream 916 from event source 906, and a third event stream 918 from event source 908. One or more event processing applications (920, 922, and 924) may be deployed on and be executed by EPS 902. An event processing application executed by EPS 902 may be configured to listen to one or more input event streams, process the events received via the one or more event streams based upon processing logic that selects one or more events from the input event streams as notable events. The notable events may then be sent to one or more event sinks (910, 912) in the form of one or more output event streams. For example, in FIG. 9, EPS 902 outputs a first output event stream 926 to event sink 910, and a second output event stream 928 to event sink 912. In certain embodiments, event sources, event processing applications, and event sinks are decoupled from each other such that one can add or remove any of these components without causing changes to the other components.

In one embodiment, EPS 902 may be implemented as a Java server comprising a lightweight Java application container, such as one based upon Equinox OSGi, with shared services. In some embodiments, EPS 902 may support ultra-high throughput and microsecond latency for processing events, for example, by using JRockit Real Time. EPS 902 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 9 provides a drilldown for one such event processing application 920. As shown in FIG. 9, event processing application 920 is configured to listen to input event stream 918, execute a continuous query 930 comprising logic for selecting one or more notable events from input event stream 918, and output the selected notable events via output event stream 928 to event sink 912. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 020 in FIG. 9 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 902 without having to store all the received events data. Accordingly, EPS 902 provides a special querying mechanism that enables processing of events to be performed as the events are received by EPS 902 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 902 for a particular event stream may be executed each time that an event is received in that event stream. As part of the continuous query execution, EPS 902 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 900 depicted in FIG. 9 may have other components than those depicted in FIG. 9. Further, the embodiment shown in FIG. 9 is only one example of a system that may incorporate an embodiment of the present disclosure. In some other embodiments, system 900 may have more or fewer components than shown in FIG. 9, may combine two or more components, or may have a different configuration or arrangement of components. System 900 can be of various types including a service provider computer, a personal computer, a portable device (e.g., a mobile telephone or device), a workstation, a network computer, a mainframe, a kiosk, a server, or any other data processing system. In some other embodiments, system 900 may be configured as a distributed system where one or more components of system 900 are distributed across one or more networks in the cloud.

The one or more of the components depicted in FIG. 9 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 10:
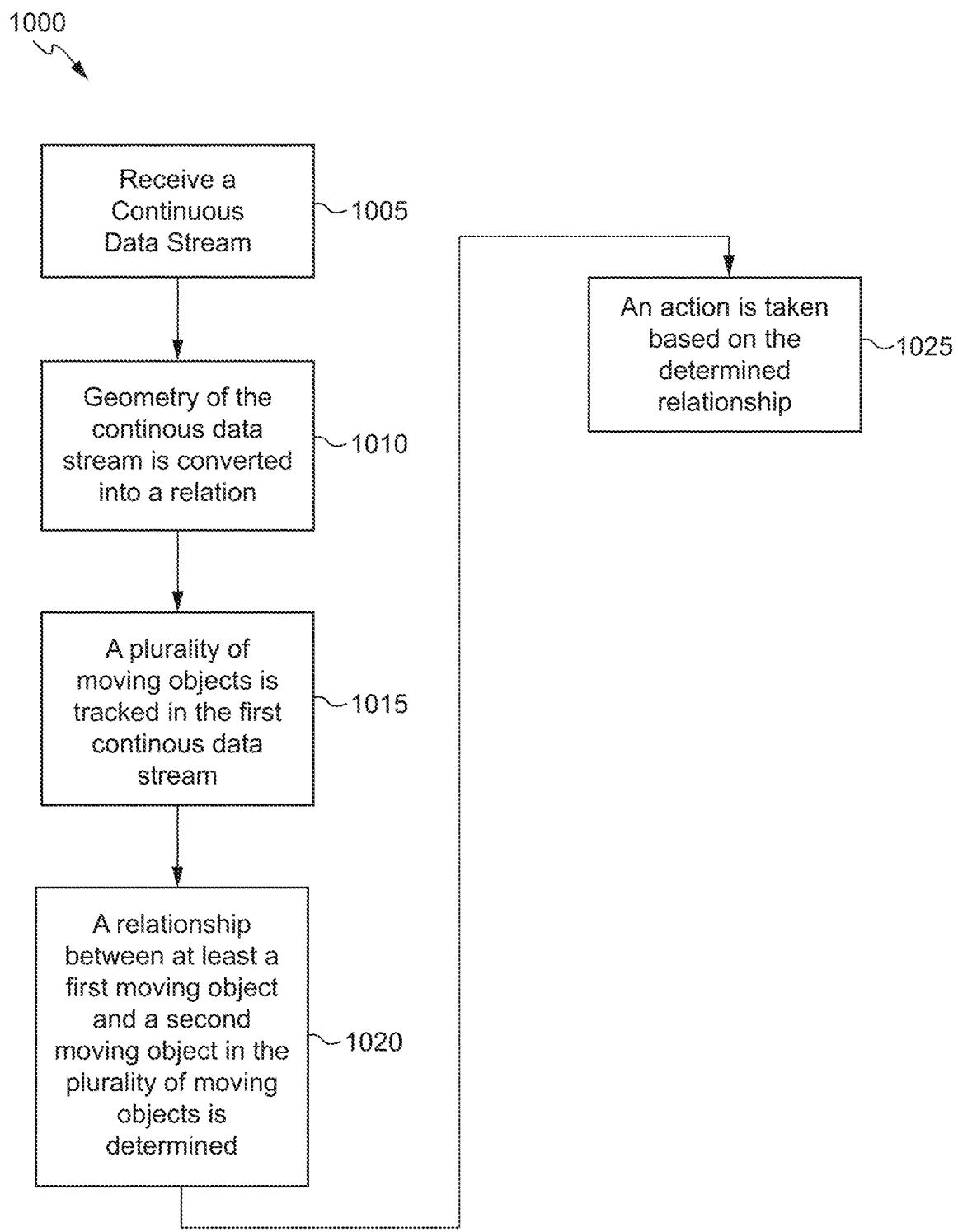
FIG. 10 is an example flow diagram of event processing in accordance with an embodiment of the present disclosure.

FIG. 10 illustrate techniques for the spatial change detection and check and set operation according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 10 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 10 is not intended to be limiting. Other sequences of steps may also be performed according to alternative embodiments. For example, in alternative embodiments the steps outlined above may be performed in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 10 shows a flowchart 1000 that illustrates a spatial change detection and/or check and set operation implemented by embodiments of the present disclosure. In some embodiments, the processes depicted in flowchart 1000 may be implemented by the event processing systems of FIGS. 8 and 9. At step 1005, a first continuous data stream related to an application receive. At step 1010, geometry of the first continuous data stream is converted into a relation. The relation may include a spatial index of the geometry of the first continuous data stream. In certain embodiments, a filter is applied to the spatial index with a range to obtain a filtered result for the geometry of the first continuous data stream. In some embodiments, the converting includes determining whether there is a change in the geometry of the first continuous data stream, and issuing an update event when there is a change in the geometry of the first continuous data stream. The update event is issued on in-memory cache supporting insert, delete, and update operations.

At step 1015, a plurality of moving objects is tracked in the first continuous data stream. The tracking may be performed using a spatial operation to track a relationship of at least the first moving object to the second moving object. At step 1020, a relationship between at least a first moving object and a second moving object in the plurality of moving objects is determined or checked based on at least one of: the geometry of the first continuous data stream and the relation. In certain embodiments, the geometry of the first continuous data stream and the relation are joining using a join operation prior to tracking.

Optionally, a second continuous data stream related to the application is received, and the relationship is determined or checked between at least a moving object in the plurality of moving objects and an object in the second continuous data stream based at least on the relation and geometry of the second continuous data stream. In some embodiments, determining the relationship comprises determining a proximity between at least a first moving object and a second moving object in the plurality of moving objects based at least on the geometry of the first continuous data stream and the relation. In other embodiments, determining the relationship comprises determining a proximity between at least the moving object in the plurality of moving objects and the object in the second continuous data stream based at least on the relation and geometry of the second continuous data stream. The determining the proximity may comprise calculating a distance between the first moving object and the second moving object using the filtered result or calculating a distance between the moving object in the plurality of moving objects and the object in the second continuous data stream.

At step 1025, an action is taken based on the determined relationship. In various embodiments, the action is performed via an operation applied to one or more of the relation, geometry of the first continuous data stream, and geometry of the second continuous data stream. In some embodiments, the action includes generating an alert when the proximity between at least the first moving object and the second moving object exceeds a predetermined threshold. In other embodiments, the action includes setting a property of the moving object when the relationship meets predetermined criteria, e.g., exceeds a predetermined threshold.

Illustrative Systems

Figure 11:
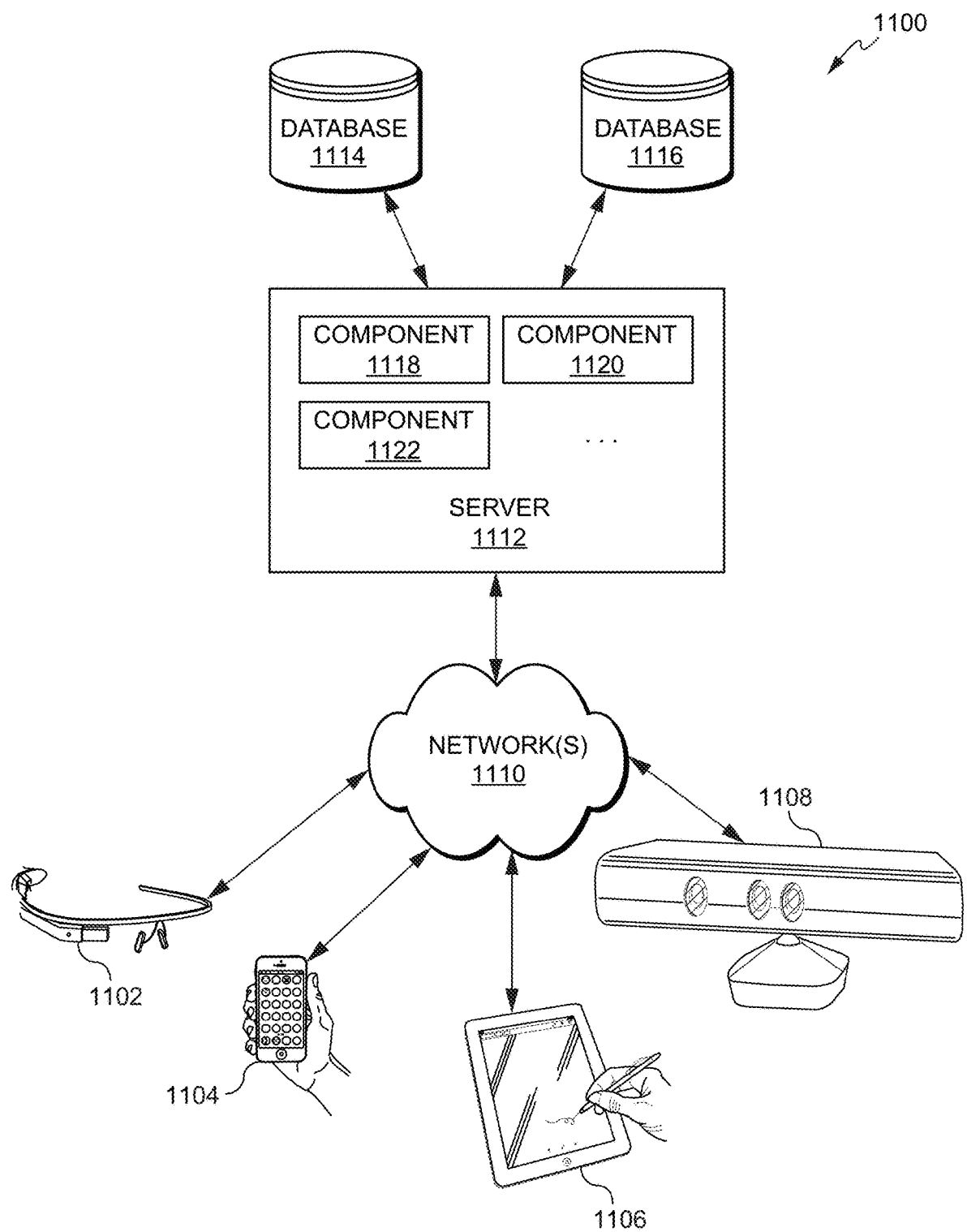
FIG. 11 depicts a simplified diagram of a distributed system for implementing an embodiment of the present disclosure.
Figure 12:
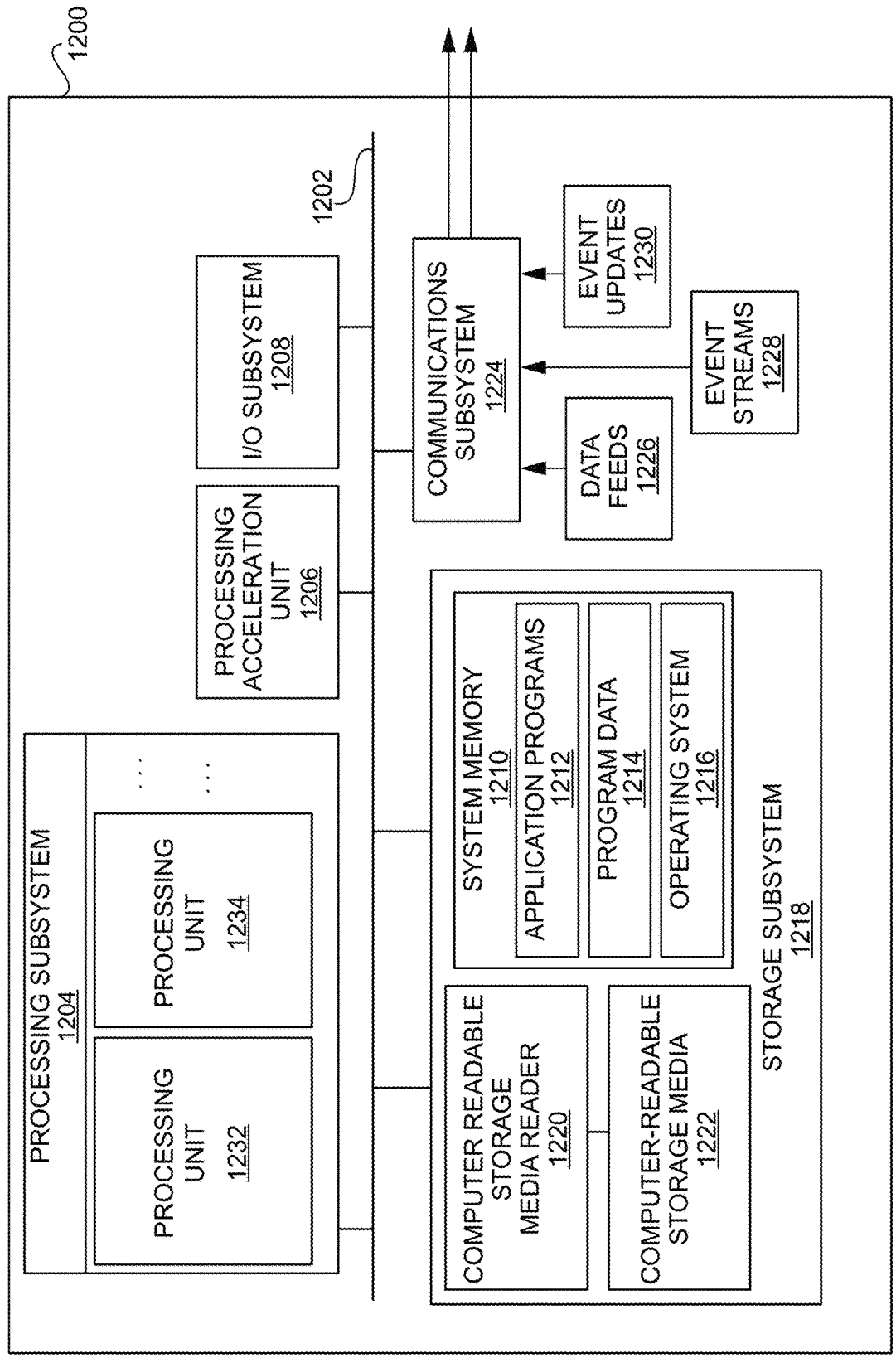
FIG. 12 is a simplified block diagram of one or more components of a system environment by which services provided by one or more components of an embodiment system may be offered as cloud services, in accordance with an embodiment of the present disclosure.
Figure 13:
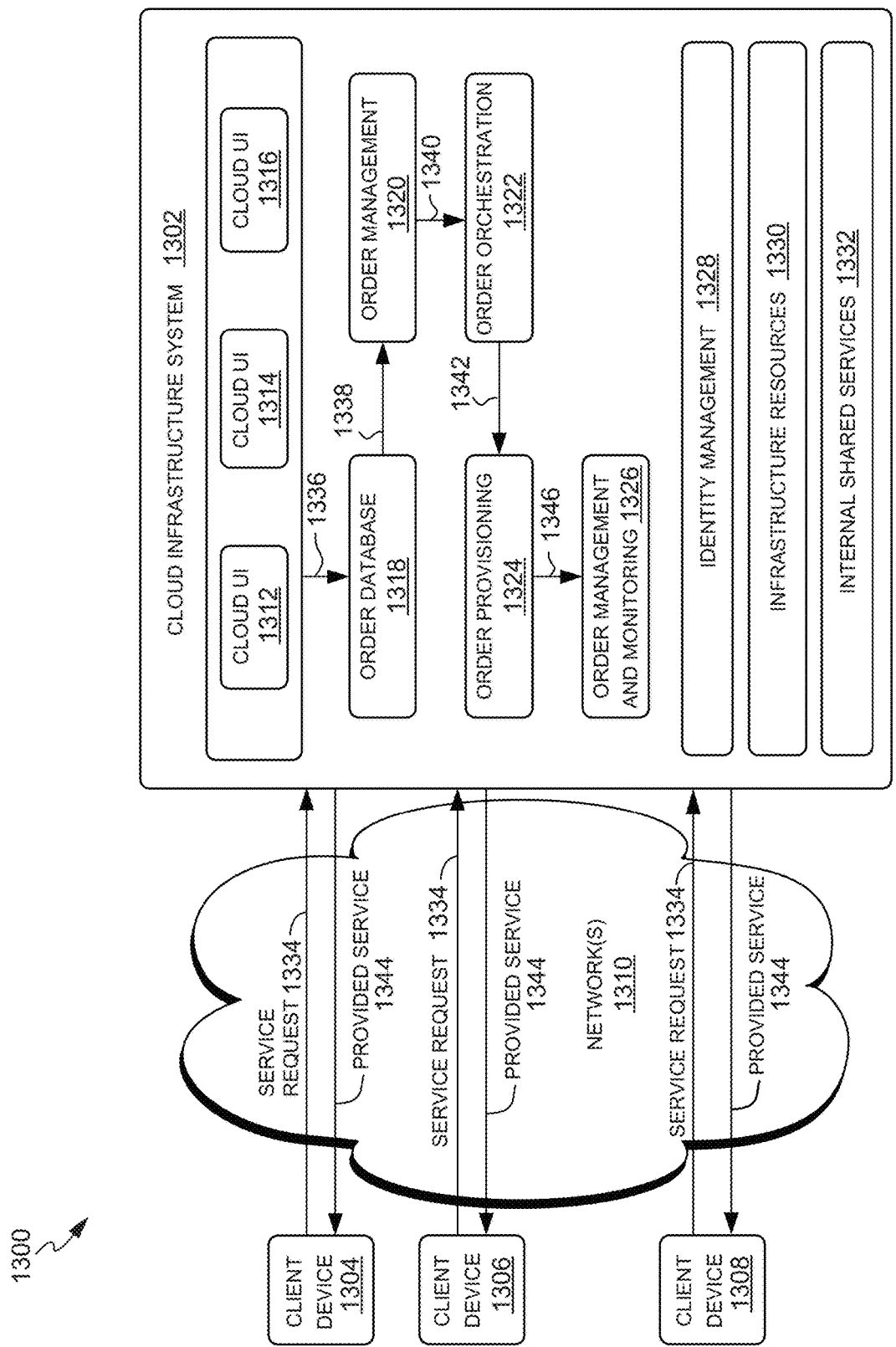
FIG. 13 illustrates an example computer system that may be used to implement an embodiment of the present disclosure.

FIGS. 11-13 illustrate aspects of example environments for implementing aspects of the present disclosure in accordance with various embodiments. FIG. 11 depicts a simplified diagram of a distributed system 1100 for implementing an embodiment of the present disclosure. In the illustrated embodiment, the distributed system 1100 includes one or more client computing devices 1102, 1104, 1106, and 1108, which are configured to execute and operate a client application such as a web browser, proprietary client (e.g., Oracle Forms), or the like over one or more network(s) 1110. The server 1112 may be communicatively coupled with the remote client computing devices 1102, 1104, 1106, and 1108 via network 1110.

In various embodiments, the server 1112 may be adapted to run one or more services or software applications such as services and applications that provide identity management services. In certain embodiments, the server 1112 may also provide other services or software applications can include non-virtual and virtual environments. In some embodiments, these services may be offered as web-based or cloud services or under a Software as a Service (SaaS) model to the users of the client computing devices 1102, 1104, 1106, and/or 1108. Users operating the client computing devices 1102, 1104, 1106, and/or 1108 may in turn utilize one or more client applications to interact with the server 1112 to utilize the services provided by these components.

In the configuration depicted in FIG. 11, the software components 1118, 1120 and 1122 of system 1100 are shown as being implemented on the server 1112. In other embodiments, one or more of the components of the system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

The client computing devices 1102, 1104, 1106, and/or 1108 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1110.

Although distributed system 1100 in FIG. 11 is shown with four client computing devices, any number of client computing devices may be supported. Other devices, such as devices with sensors, etc., may interact with the server 1112.

The network(s) 1110 in the distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1112 can include one or more virtual machines running virtual operating systems, or other computing architectures involving virtualization. One or more flexible pools of logical storage devices can be virtualized to maintain virtual storage devices for the server. Virtual networks can be controlled by the server 1112 using software defined networking. In various embodiments, the server 1112 may be adapted to run one or more services or software applications described in the foregoing disclosure. For example, the server 1112 may correspond to a server for performing processing as described above according to an embodiment of the present disclosure.

The server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1112 may include one or more applications to analyze and consolidate data feeds and/or event updates received from users of the client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1112 may also include one or more applications to display the data feeds and/or real-time events via one or more display devices of the client computing devices 1102, 1104, 1106, and 1108.

The distributed system 1100 may also include one or more databases 1114 and 1116. These databases may provide a mechanism for storing information such as user identity information, and other information used by embodiments of the present disclosure. Databases 1114 and 1116 may reside in a variety of locations. By way of example, one or more of databases 1114 and 1116 may reside on a non-transitory storage medium local to (and/or resident in) the server 1112. Alternatively, the databases 1114 and 1116 may be remote from the server 1112 and in communication with the server 1112 via a network-based or dedicated connection. In one set of embodiments, the databases 1114 and 1116 may reside in a storage-area network (SAN). Similarly, any necessary files for performing the functions attributed to the server 1112 may be stored locally on the server 1112 and/or remotely, as appropriate. In one set of embodiments, the databases 1114 and 1116 may include relational databases, such as databases provided by Oracle, that are adapted to store, update, and retrieve data in response to SQL-formatted commands.

FIG. 12 illustrates an exemplary computer system 1200 that may be used to implement an embodiment of the present disclosure. In some embodiments, computer system 1200 may be used to implement any of the various servers and computer systems described above. As shown in FIG. 12, computer system 1200 includes various subsystems including a processing subsystem 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1210 including potentially on one or more storage devices. Through suitable programming, processing subsystem 1204 can provide various functionalities described above for dynamically modifying documents (e.g., webpages) responsive to usage patterns.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. Additionally, communication subsystem 1224 may be used to communicate notifications of successful logins or notifications to re-enter a password from the privileged account manager to the requesting users.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the disclosure. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1102, 1104, 1106, and 1108.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1610.

Cloud infrastructure system 1302 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302. At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method for dynamically determining a size of a partition, comprising:
   receiving, by a computing device, a continuous data stream related to an application;
   identifying, by the computing device, an input geometry associated with the continuous data stream, the input geometry specifying a region in the continuous data stream to be partitioned;
   generating, by the computing device, a cluster of geometries based at least in part on the input geometry;
   generating, by the computing device, an output geometry based at least in part on the cluster of geometries and a number of geometries in each cluster of the cluster of geometries;
   determining, by the computing device, one or more partitions for the output geometry based on the cluster of geometries and the number of geometries in each cluster of the cluster of geometries;
   detecting, by the computing device, a change in the cluster of geometries, wherein the detecting the change comprises:
      comparing the cluster of geometries to other cluster of geometries within an index;
      determining the cluster of geometries is represented within the index based on the comparing; and
      in response to determining the cluster of geometries is within the index, identifying a size threshold value and detecting the change in the cluster of geometries based on the size threshold value and the comparing;
   in response to detecting the change in the cluster of geometries, dynamically, by the computing device, changing a size of the one or more partitions for the output geometry relative to the change in the cluster of geometries based on a spatial clustering algorithm that combines spatial clustering and grid partitioning; and
   transmitting, by the computing device, the output geometry associated with the continuous data stream.

2. The method of claim 1, wherein the changing the size of the one or more partitions includes determining a grid range, creating a grid index to partition index table, and setting the grid index to partition index table to a cluster object stored in index such that the cluster object can be used in assigning a partition identifier.

3. The method of claim 2, wherein the decision of the grid range is implemented by a configuration parameter, a grid size, a grid size effect factor, and the number of geometries in each cluster of the cluster of geometries.

4. A system, comprising:
   a memory configured to store computer-executable instructions; and
   a processor configured to access the memory and execute the computer-executable instructions to:
   receive a continuous data stream related to an application;
   identify an input geometry associated with the continuous data stream, the input geometry specifying a region in the continuous data stream to be partitioned;
   generate a cluster of geometries based at least in part on the input geometry;
   generate an output geometry based at least in part on the cluster of geometries and a number of geometries in each cluster of the cluster of geometries;
   determine one or more partitions for the output geometry based on the cluster of geometries and the number of geometries in each cluster of the cluster of geometries;
   detect a change in the cluster of geometries, wherein the detecting the change comprises:
      comparing the cluster of geometries to other cluster of geometries within an index;
      determining the cluster of geometries is represented within the index based on the comparing; and
      in response to determining the cluster of geometries is within the index, identifying a size threshold value and detecting the change in the cluster of geometries based on the size threshold value and the comparing;
   in response to detecting the change in the cluster of geometries, dynamically change a size of the one or more partitions for the output geometry relative to the change in the cluster of geometries based on a spatial clustering algorithm that combines spatial clustering and grid partitioning; and
   transmit the output geometry associated with the continuous data stream.

5. The system of claim 4, wherein the changing the size of the one or more partitions includes determining a grid range, creating a grid index to partition index table, and setting the grid index to partition index table to a cluster object stored in index such that the cluster object can be used in assigning a partition identifier.

6. The system of claim 5, wherein the decision of the grid range is implemented by a configuration parameter, a grid size, a grid size effect factor, and the number of geometries in each cluster of the cluster of geometries.

7. A non-transitory computer-readable medium storing computer-executable code that, when executed by a processor, cause the processor to perform operations comprising:
- receiving a continuous data stream related to an application;
- identifying an input geometry associated with the continuous data stream, the input geometry specifying a region in the continuous data stream to be partitioned;
- generating a cluster of geometries based at least in part on the input geometry;
- generating an output geometry based at least in part on the cluster of geometries and a number of geometries in each cluster of the cluster of geometries;
- determining one or more partitions for the output geometry based on the cluster of geometries and the number of geometries in each cluster of the cluster of geometries;
- detecting a change in the cluster of geometries, wherein the detecting the change comprises:
  - comparing the cluster of geometries to other cluster of geometries within an index;
  - determining the cluster of geometries is represented within the index based on the comparing; and
  - in response to determining the cluster of geometries is within the index, identifying a size threshold value and detecting the change in the cluster of geometries based on the size threshold value and the comparing;
- in response to detecting the change in the cluster of geometries, dynamically changing a size of the one or more partitions for the output geometry relative to the change in the cluster of geometries based on a spatial clustering algorithm that combines spatial clustering and grid partitioning; and
- transmitting the output geometry associated with the continuous data stream.

8. The computer-readable medium of claim 7, wherein the changing the size of the one or more partitions includes determining a grid range, creating a grid index to partition index table, and setting the grid index to partition index table to a cluster object stored in index such that the cluster object can be used in assigning a partition identifier.

9. The computer-readable medium of claim 8, wherein the decision of the grid range is implemented by a configuration parameter, a grid size, a grid size effect factor, and the number of geometries in each cluster of the cluster of geometries.

* * * * *

UNITED STATES PATENT AND TRADEMARK OFFICE
CERTIFICATE OF CORRECTION

PATENT NO. : 10,698,903 B2  
APPLICATION NO. : 15/705402  
DATED : June 30, 2020  
INVENTOR(S) : Park et al.

Page 1 of 1

It is certified that error appears in the above-identified patent and that said Letters Patent is hereby corrected as shown below:

On the Title Page

On page 2, Column 2, item [56], Line 3, delete "USA,," and insert -- USA, --, therefor.

In the Drawings

On sheet 10 of 13, in FIG. 10, under Reference Numeral 1010, Line 2, delete "continous" and insert -- continuous --, therefor.

On sheet 10 of 13, in FIG. 10, under Reference Numeral 1015, Line 4, delete "continous" and insert -- continuous --, therefor.

On sheet 12 of 13, in FIG. 12, under Reference Numeral 1220, Line 1, delete "COMPUTER READABLE" and insert -- COMPUTER-READABLE --, therefor.

In the Specification

Column 14, Line 41, delete "DBSPAN." and insert -- DBSCAN. --, therefor.

Column 16, Line 36, delete "predtermined" and insert -- predetermined --, therefor.

Column 21, Line 14, delete "(2)" and insert -- (3) --, therefor.

Column 26, Line 27, delete "computer readable" and insert -- computer-readable --, therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*